United States Patent
Hoctor et al.

(10) Patent No.: US 6,288,632 B1
(45) Date of Patent: *Sep. 11, 2001

(54) APPARATUS AND METHOD FOR POWER LINE COMMUNICATION (PLC)

(75) Inventors: Ralph Thomas Hoctor, Saratoga Springs; John Erik Hershey, Ballston Lake, both of NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/467,793

(22) Filed: Dec. 20, 1999

(51) Int. Cl.[7] .................................................. H04M 11/04
(52) U.S. Cl. ................................ 340/310.01; 340/310.06; 340/870.03; 375/200; 375/205
(58) Field of Search .................. 340/310.01, 310.02, 340/310.06, 870.02, 870.03, 825.02; 375/200, 205, 346

(56) References Cited

U.S. PATENT DOCUMENTS

| | | | |
|---|---|---|---|
| 4,700,188 | * 10/1987 | James | 340/870.03 |
| 5,032,833 | * 7/1991 | Laporte | 340/825.02 |
| 5,519,692 | * 5/1996 | Hershey et al. | 375/205 |
| 5,519,725 | * 5/1996 | Hershey et al. | 375/200 |
| 5,731,765 | * 3/1998 | Allison et al. | 340/310.06 |
| 5,844,949 | * 12/1998 | Hershey et al. | |
| 5,903,594 | * 5/1999 | Saulnier et al. | 375/200 |

OTHER PUBLICATIONS

"GHM Signaling for Automatic Meter Reading (AMR)," J.E. Hershey, GE Tech. Report 96CRD140, Oct. 1996.
"Digital Communications," J.G. Proakis, McGraw–Hill, New York, 1995, pp. 686–692.

* cited by examiner

Primary Examiner—Daniel J. Wu
Assistant Examiner—John Tweel, Jr.
(74) Attorney, Agent, or Firm—Jill M. Breedlove; Douglas E. Stoner

(57) ABSTRACT

The invention provides a transmitter and a signal for communicating information via a power line. The signal comprises a superset and the superset comprises a plurality of tone sets. The superset is characterized by the relationship:

$$s_i(t) = \sum_{k=1}^{M} \{\alpha_k \sin(2\pi f_{ik} t + \phi_k) + \beta_k \cos(2\pi f_{ik} t + \theta_k)\}$$

wherein t is time, i is a tone set index, k is a tone index, and wherein $f_{ik}$ represents the frequency of the kth tone of the ith user, and wherein M is the number of tones per tone set, $\alpha_k$, $\beta_k$, are signal amplitudes, and $\phi_k$, $\theta_k$ are phase offsets. The signal is characterized by a spectral shape exhibiting a plurality of main lobes within a harmonic interval, each of the main lobes corresponding to a different tone set.

15 Claims, 3 Drawing Sheets

APPARATUS AND METHOD FOR POWER LINE COMMUNICATION (PLC)

BACKGROUND OF THE INVENTION

The present invention relates to communications systems and more particularly to power line communications systems. Electric power companies typically have a service person visit customers and read a power meter to determine the amount of power consumed for billing purposes. This can become very cumbersome and time consuming with a large number of customers.

It would be beneficial for power companies to read electric power meters remotely. Power lines are wires that convey power signals from a power source, such as a power generation station to a power customer, such as a home or business. There are extant power lines to each customer's power meter and these are advantageously configured for communicating data between a power company and power meters. However, conventional modulation techniques are not readily adaptable to operate in the high-power, high-noise environment of a power line.

Conventional solutions to the problem of transmitting data over a power line typically utilize complex and cumbersome equipment and techniques in order to perform reliably in the high-power, high-noise, phase distorted power line channels. For example, some systems monitor different frequency channels, select an appropriate channel, and then indicate the appropriate frequency to other communicating units. Others employ a plurality of signals which are not harmonically related. This requires complicated filtering and signal extraction.

Currently there is a need for a less complicated communication system that employs existing power lines to efficiently transmit data.

BRIEF SUMMARY OF THE INVENTION

The invention provides an apparatus and method for communicating information via a power line. The signal of the invention comprises a superset of a plurality of tone sets. The superset is characterized by the relationship:

$$s_i(t) = \sum_{k=1}^{M} \{\alpha_k \sin(2\pi f_{ik} t + \phi_k) + \beta_k \cos(2\pi f_{ik} t + \theta_k)\}$$

wherein t is time, i is a tone set index, k is a tone index, and wherein $f_{ik}$ represents the frequency of the kth tone of the ith user, and wherein M is the number of tones per tone set, $\alpha_k$, $\beta_k$, are signal amplitudes, and $\phi_k$, $\theta_k$ are phase offsets. The signal is characterized by having a spectral shape exhibiting, within a harmonic interval, a plurality of main lobes of the signal. Each of the main lobes within the harmonic interval corresponds to a different tone set.

DETAILED DESCRIPTION OF THE INVENTION

For a description of general Geometric Harmonic Modulation (GHM) techniques for power line communications systems, reference may be made to U.S. Pat. No. 5,844,949 issued Dec. 1, 1998, "Power Line Communication System", and to U.S. Pat. No. 5,903,594 issued May 11, 1999, "Power Line Communications Spread Spectrum Protocol", both of which are assigned to the present assignee.

GHM is a spread spectrum modulation technique that allocates signaling energy into a plurality of tones, referred to herein as a "tone set", each tone in the tone set modulated by the same data to be transmitted. A "tone" is a sound corresponding to a specific frequency. When a tone is modulated by data to be transmitted, the resulting waveform takes on a spectral shape referred to herein as a "lobe". Therefore, the term "lobe" refers generally to the spectral shape obtained by plotting energy as a function of frequency in the spectral region on both sides of a given tone frequency. A main lobe is centered at about the tone frequency, and side-lobes occur at integer multiples thereof. Signaling energy is generally highest at about the tone frequency. Therefore, a tone frequency generally corresponds to the peak of a main lobe. The frequencies at either side of the tone frequency at which the energy content drops to about zero are referred to herein as "nulls". Accordingly, nulls define the end points of a lobe. A plurality of lobes M define the spectral shape of a tone set.

In a typical GHM coding scheme binary data is provided to a modulator and is coded therein according to a differential phase shift keying (DPSK) method whereby the GHM carrier is inverted or not inverted during a bit duration interval according to the binary state of the data. A bit duration interval is defined to be the time duration of a single binary digit of data to be transmitted. Signaling rate R is defined to be the inverse of bit duration interval.

Figure 1:
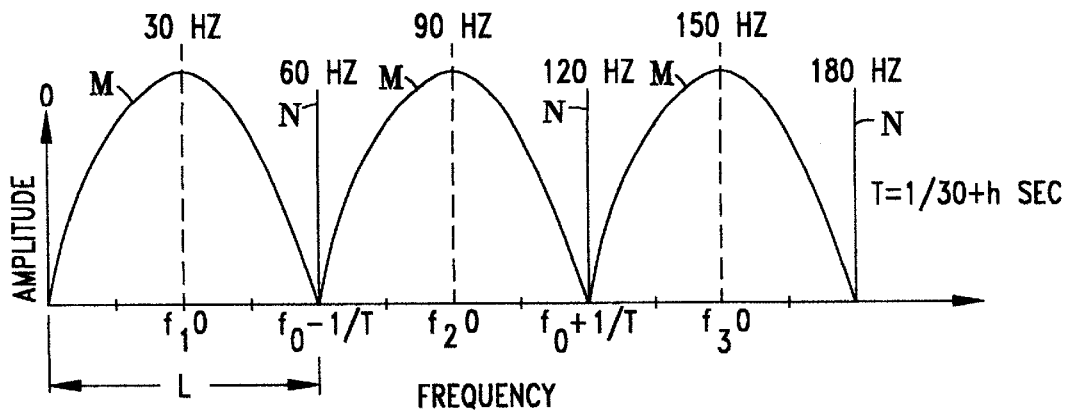
FIG. 1 is a graph of a signaling power spectra of a signal produced by Geometric Harmonic Modulation (GHM) interleaved with power line interference.

FIG. 1 provides an example of a typical GHM frequency allocation scheme. Frequency versus energy is plotted along a range of frequencies in the power line spectrum. The fundamental 60 Hz power line signal and harmonics at integer multiples thereof are indicated at N. The portion of the spectrum lying between pairs of successive harmonics, and between a fundamental frequency and a harmonic on either side thereof, is referred to herein as a harmonic interval, and is depicted at L in FIG. 1. Main lobes M comprise a tone set. Each tone set is typically allocated to a single user. The tones in a tone set are selected to provide lobes positioned on the power line frequency spectrum such that each main lobe of the set is positioned at about the middle of a corresponding harmonic interval L.

For example, three lobes M of a conventional GHM signal are illustrated in FIG. 1. The lobes have tone frequencies of 30 Hz, 90 Hz, and 150 Hz respectively. These tone frequencies lie halfway between successive pairs of power line harmonic frequencies, i.e., 0 Hz and 60 Hz, 60 Hz and 120 Hz and 120 Hz and 180 Hz respectively. Each main lobe has a bandwidth of 60 Hz. Since power line noise has a great deal of interference at its fundamental frequency of 60 Hz, and at harmonics thereof, the GHM signal is generated such that each lobe has nulls at these frequency regions. Thus, the GHM signal is received over a power line communication link substantially without interference from the 60 Hz power line signal.

It is important to note that for purposes of illustration and explanation, only three GHM lobes are shown in FIG. 1, and each has a relatively low corresponding tone frequency.

However, in typical situations, more than 3 lobes comprise a GHM tone set and those lobes typically have tone frequencies in the range of 5–10 kHz. Each tone frequency is selected to lie in about in the middle of its corresponding harmonic interval L.

An example table of frequencies $\{f_{i,k}\}$ for a multiple access embodiment of GHM system comprising ten users, each user employing eight tones to transmit data, is given in Table 1. A user is defined to be an originator of data to be transmitted and is identified by the index i. Tones are identified by the index k.

TABLE 1

| | {f_{ik}} in Hz | | | | | | | |
|---|---|---|---|---|---|---|---|---|
| i | k = 1 | k = 2 | k = 3 | k = 4 | K = 5 | K = 6 | k = 7 | k = 8 |
| 1 | 5010 | 5610 | 6210 | 6810 | 7410 | 8010 | 8610 | 9210 |
| 2 | 5070 | 5670 | 6270 | 6870 | 7470 | 8070 | 8670 | 9270 |
| 3 | 5130 | 5730 | 6330 | 6930 | 7530 | 8130 | 8730 | 9330 |
| 4 | 5190 | 5790 | 6390 | 6990 | 7590 | 8190 | 8790 | 9390 |
| 5 | 5250 | 5850 | 6450 | 7050 | 7650 | 8250 | 8850 | 9450 |
| 6 | 5310 | 5910 | 6510 | 7110 | 7710 | 8310 | 8910 | 9510 |
| 7 | 5370 | 5970 | 6570 | 7170 | 7770 | 8370 | 8970 | 9570 |
| 8 | 5430 | 6030 | 6630 | 7230 | 7830 | 8430 | 9030 | 9630 |
| 9 | 5490 | 6090 | 6690 | 7290 | 7890 | 8490 | 9030 | 9690 |
| 10 | 5550 | 6150 | 6750 | 7350 | 7950 | 8550 | 9150 | 9750 |

The present invention takes advantage of the relationship between bit duration interval and main lobe bandwidth to provide a transmitter which generates a GHM signal having greater data transport capabilities than those achieved using the conventional GHM technique described above.

Figure 2:
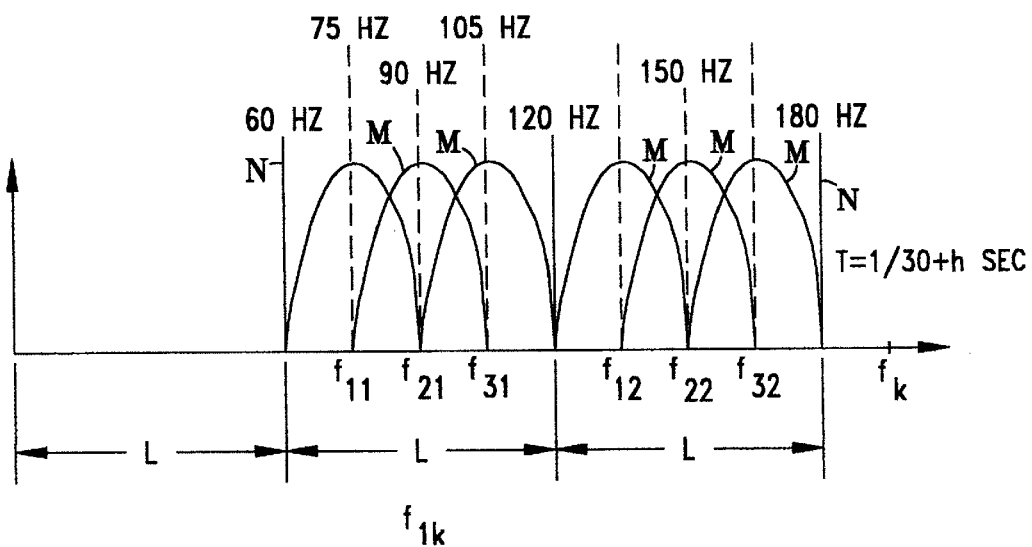
FIG. 2 is a simplified block diagram depicting a superset comprising tone sets.

FIG. 2 depicts a GHM signal according to one embodiment of the present invention. Unlike the typical GHM signal depicted in FIG. 1, the signal depicted in FIG. 2 is characterized by a superset of tones positioned within one harmonic interval L. The superset comprises a plurality of tone sets, each tone set comprising a plurality of tones. In other words, each lobe M corresponds to a tone $f_{ik}$, wherein i represents a tone set, and k represents a particular tone in the tone set. FIG. 2 illustrates one embodiment of the invention wherein a superset comprises 3 tone sets $f_{1k}$, $f_{2k}$ and $f_{3k}$. The first tone set $f_{1k}$ comprises a plurality of tone frequencies, e.g., $f_{11}$, $f_{12}$. The second tone set $f_{2k}$ comprises a plurality of tone frequencies, e.g. $f_{21}$, $f_{22}$, and so on. It is important to note that the number of tones depicted in a tone set in FIG. 2 limited to two. This is merely for purposes of explanation. Practical embodiments of the invention will have more tones per tone set. For example, one embodiment of the invention utilizes 8 tones per tone set.

The signal of FIG. 2 is further characterized in that nulls of all lobes of the superset coincide with the power line harmonic frequencies N. The signal of FIG. 2 is further characterized by the fact that at least one main lobe of the superset has a null coinciding with the tone frequency of at least one other main lobe of the same superset.

One embodiment of the invention allocates an entire superset to a first user, thus providing a higher data transmission rate than is achieved by typical GHM transmission techniques. An alternative embodiment of the invention allocates at least one of the tone sets of the superset to a second user. In yet another embodiment of the invention each tone set of the superset is allocated to a different user. Thus, the invention provides more efficient utilization of the power line spectrum. Greater data transport rates for a given portion of the power line spectrum are thereby achieved. In the case where a single superset is assigned to one user, the user's data transmission rate is increased over that obtained with typical GHM systems.

To generate a signal comprising the superset described above, the invention exploits the relationship between bit duration interval T and main lobe bandwidth BW. This relationship is expressed as follows:

$$BW = 2/T$$

Accordingly, the signal depicted in FIG. 2 is generated by adjusting the bit duration interval of the data to be transmitted such that a main lobe bandwidth of each tone in each tone set in a given superset is about 30 Hz. In a superset comprising 3 tone sets, a bandwidth of 30 Hz allows each tone set in the superset to be positioned with respect to the other tone sets such that nulls of all the resulting lobes, including main lobes and side lobes, occur at about the power line harmonic frequencies. A bandwidth of about 30 Hz is achieved by setting the bit duration interval to about $\frac{1}{15}^{th}$ of a second.

It is to be understood that other embodiments of the invention have supersets comprising more, or less, tone sets having lobes from each set falling within one harmonic interval. In each embodiment the bandwidth of the lobes are set such that nulls occur at about the power line harmonic frequencies.

Figure 3:
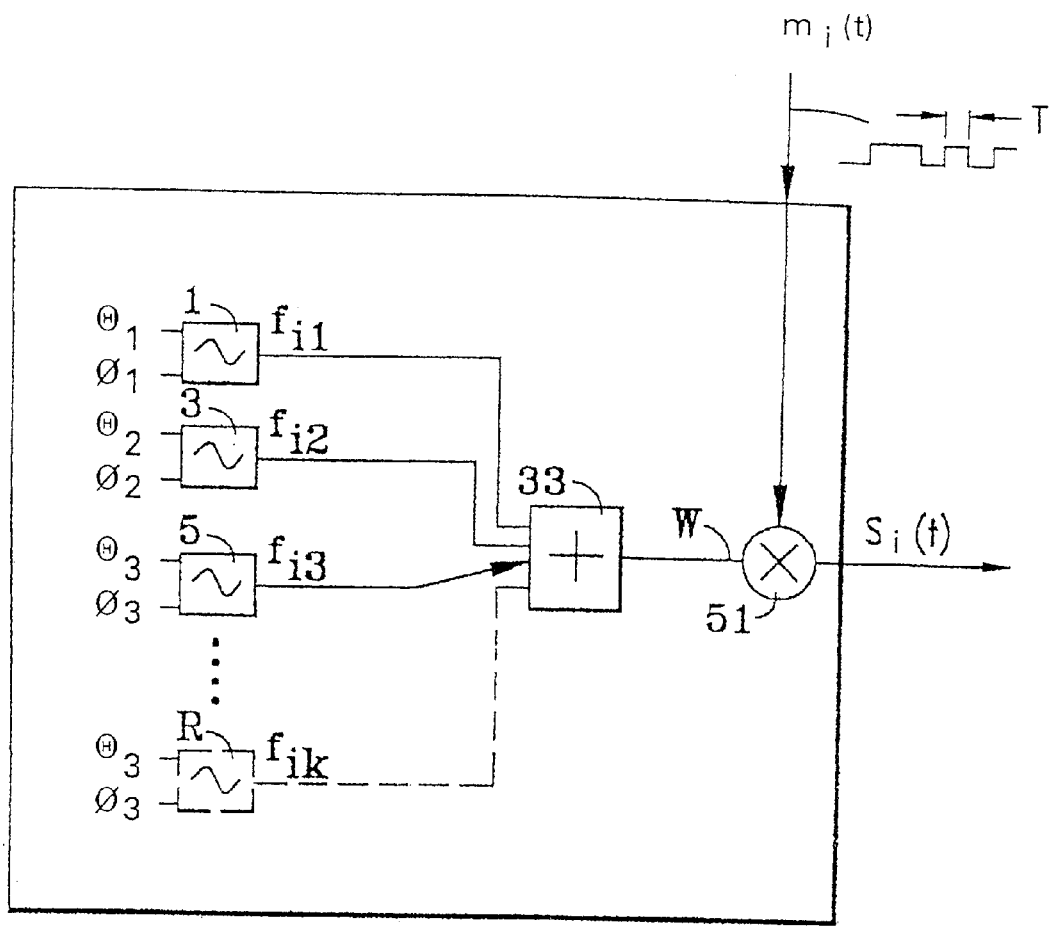
FIG. 3 is a simplified block diagram of an embodiment of a GHM transmitter configured to transmit data over a power line.

FIG. 3 shows an embodiment of a transmitter circuit configured to transmit a tone set. Signal generators 1, 3 and 5 are configured to generate tones comprising the tone set, the tones having respective frequencies $f_{01}$ through $f_{03}$. In this specification the term "configured" means operatively connected to perform a specified function. It is to be understood that practical embodiments of the invention will have more signal generators for providing more tones per tone set. In one embodiment of the invention, each signal generator includes controls for adjusting the phase and amplitude of its corresponding output tone.

The tone output of each generator is coupled to a summer 33. Summer 33 combines the tones to provide a combined output signal W. Signal W is coupled to a first input of modulator 51. Data to be transmitted m(t) is provided to a second input to modulator 51. Modulator 51 is configured to encode message signal m(t) onto the 3 tones using a DPSK coding scheme. For example, modulator 51 codes the message by inverting or not inverting signal W for a bit duration interval. The output of modulator 51 is coupled to a power line for transmission of the data encoded upon the tone set.

Figure 4:
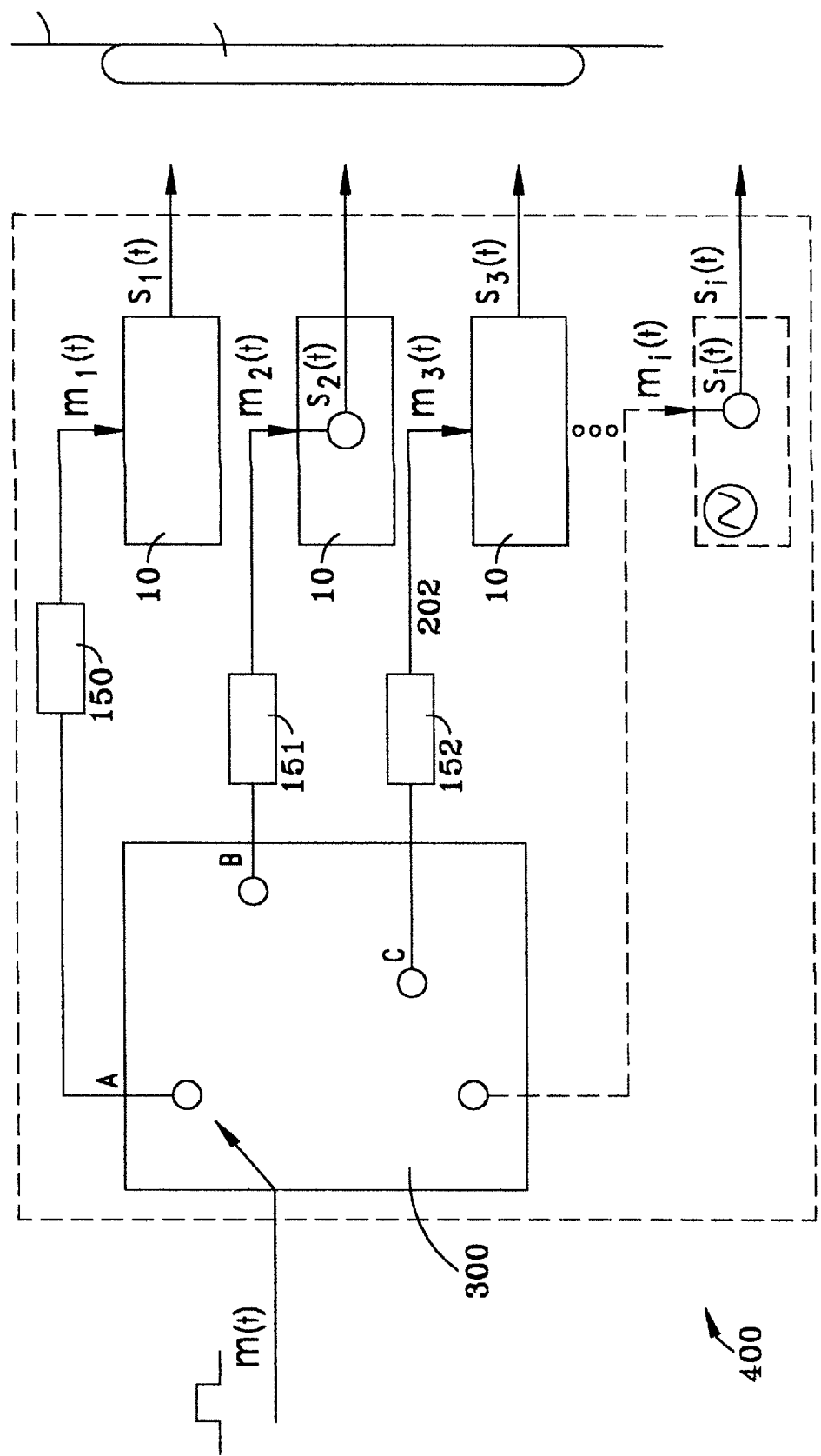
FIG. 4 is a block diagram of a transmitter of an embodiment of the invention.

FIG. 4 illustrates a transmitter 400 according to an embodiment of the present invention. Transmitter 400 comprises a plurality of transmit circuits 10. Each transmit circuit 10 depicted in FIG. 4 is configured as illustrated in FIG. 3. Transmitter 400 further includes commutator 300 and delay units 150, 151 and 152. Commutator 300 is a switching device configured to receive the signal to be transmitted m(t) and to switch the signal in a time divided fashion between commutator outputs A, B and C. Delay units 150, 151 and 152 are coupled to outputs A, B and C respectively of commutator 300. Delay units 150, 151 and 152 are configured to delay each received bit for a period sufficient to provide a simultaneous output of successive triplets, for example $m_1(t)$ $m_2(t)$ and $m_3(t)$ of signal m(t), to transmit circuits 10. For example, in one embodiment of the invention delay unit 150 has a delay of 3 bit duration intervals, delay unit 151 has a delay of 2 bit duration intervals and delay unit 152 has a delay of 3 bit duration intervals.

The output of transmitter 400 comprises a signal $s_t(t)$, the signal characterized by the relationship:

$$s_i(t) = \sum_{k=1}^{M} \{\alpha_k \sin(2\pi f_{ik} t + \phi_k) + \beta_k \cos(2\pi f_{ik} t + \theta_k)\}$$

wherein t is time, i is a tone set index, k is a tone index, and wherein $f_{ik}$ represents the frequency of the kth tone of the ith tone set. M is the number of tones per tone set, $\alpha_k$, $\beta_k$, are signal amplitudes, and $\phi_k$, $\theta_k$ are phase offsets.

The signal $s_i(t)$ is further characterized by a spectral shape generally corresponding to that illustrated in FIG. 2. In other words, each lobe M is spaced from the other lobes such that nulls of each lobe coincide with power line harmonics. Three main lobes M lie between a single harmonic interval. In embodiments of the invention employing multiple supersets, three main lobes M lie between respective harmonic intervals. Each lobe is spaced in frequency from the other lobes such that each lobe has at least one null coinciding with a tone frequency of at least one other lobe.

While several embodiments of the invention have been described in detail herein, many modifications and variations will now become apparent to those skilled in the art. It is, therefore, to be understood that the appended claims are intended to cover all such modifications and variations as fall within the true spirit of the invention.

What is claimed is:

1. A signal for communicating information via a power line, the signal comprising a superset, said superset comprising a plurality of tone sets, said superset characterized by the relationship:

$$s_i(t) = \sum_{k=1}^{M} \{\alpha_k \sin(2\pi f_{ik} t + \phi_k) + \beta_k \cos(2\pi f_{ik} t + \theta_k)\}$$

wherein t is time, i is a tone set index, k is a tone index, and wherein $f_{ik}$ represents the frequency of the kth tone of the ith user, and wherein M is the number of tones per tone set, $\alpha_k$, $\beta_k$, are signal amplitudes, and $\phi_k$, $\theta_k$ are phase offsets.

2. The signal of claim 1 including a plurality of transmit circuits, said plurality of transmit circuits providing corresponding tone sets, said transmit circuits configured to modulate said data onto said tone sets to provide a modulated signal for transmission.

3. The signal of claim 1 further characterized by a spectral shape exhibiting a plurality of main lobes M positioned within a harmonic interval L, each of said main lobes M corresponding to a different tone set.

4. The signal of claim 3 wherein said main lobes M are characterized by nulls occurring at frequencies coinciding with power line harmonic frequencies defining said harmonic interval L.

5. The signal of claim 2 wherein at least one of said main lobes M is characterized by nulls coinciding with the tone frequency of at least one other main lobe positioned within said same harmonic interval L.

6. The signal of claim 2 wherein the number of said lobes positioned within said same harmonic interval L is three, and the bandwidth of said main lobes is 30 Hz.

7. A transmitter for transmitting data over a power line, said power line carrying electrical power having harmonic interference frequencies defining harmonic intervals L along a power line frequency spectrum, said transmitter comprising a plurality of transmit circuits, each transmit circuit comprising:

at least one signal generator configured to generate a plurality of tones comprising a tone set;

a summer coupled to said at least one signal generator, said summer configured to combine said plurality of tones and to provide a summed signal at an output;

a modulator adapted to receive said summed output and to modulate said summed signal with data to be transmitted;

each of said transmitter circuits configured to generate a plurality of main lobes corresponding to the tones of said tone set, said main lobes being positioned on the power line spectrum such that at least one main lobe of each tone set lies within the same harmonic interval L.

8. The transmitter of claim 7 including a commutator configured to convey bits of said data to respective modulators of said transmitter circuits.

9. The transmitter of claim 8 including a plurality of delay lines, each delay line having an input coupled to said commutator and an output coupled to a corresponding modulator, said delay lines adapted to receive bits of said data from said commutator and to provide a delayed output of said received bits to said modulator.

10. A system for communicating digital information over a wire, said system comprising:

a transmitter adapted to transmit data over a power line, said power line having a harmonic interference frequencies defining harmonic intervals along a power line frequency spectrum, said transmitter comprising a plurality of transmit circuits, each transmit circuit comprising:

at least one signal generator configured to generate a plurality of tones comprising a tone set;

a summer coupled to said at least one signal generator, said summer adapted to combine said plurality of tones and to provide a summed signal at an output;

a modulator adapted to receive said summed signal and to modulate said summed signal with data to be transmitted;

each of said transmitter circuits configured to generate a plurality of main lobes M corresponding to tones of said tone set, said main lobes M being positioned on the power line spectrum such that at least one main lobe M of each tone set lies within the same harmonic interval L; and a receiver configured to receive signals $s_i(t)$ having the general relationship:

$$s_i(t) = \sum_{k=1}^{M} \{\alpha_k \sin(2\pi f_{ik} t + \phi_k) + \beta_k \cos(2\pi f_{ik} t + \theta_k)\}$$

wherein t is time, i is a user index, k is a tone index, and wherein $f_{ik}$ represents the frequency of the kth tone of the ith user, and wherein M is the number of tones per user, $\alpha_k$, $\beta_k$, are signal amplitudes, and $\phi_k$, $\theta_k$ are phase offsets.

11. A method of transmitting data over a power line, said power line carrying electric power having harmonic interference frequencies defining harmonic intervals along a power line frequency spectrum, the method comprising the steps of:

generating a signal comprising a plurality of tone sets, each tone set generated by the method comprising the steps of:

generating a plurality of tone frequencies to comprise a tone set;

combining said tone frequencies to provide a summed signal;

modulating said summed signal in accordance with data to be transmitted;

transmitting said modulated summed signal;

selecting said tone frequencies such that a plurality of tone frequencies lie within a harmonic interval, each of said tone frequencies corresponding to a different tone set.

12. The method of claim 11 wherein said signal is characterized by the relationship:

$$s_i(t) = \sum_{k=1}^{M} \{\alpha_k \sin(2\pi f_{ik} t + \phi_k) + \beta_k \cos(2\pi f_{ik} t + \theta_k)\}$$

wherein t is time, i is a user index, k is a tone index, and wherein $f_{ik}$ represents the frequency of the kth tone of the ith user, and wherein M is the number of tones per user, $\alpha_k$, $\beta_k$, are signal amplitudes, and $\phi_k$, $\theta_k$ are phase offsets.

13. The method of claim 11 wherein each of said tone frequencies corresponds to a main lobe and said tone frequencies are further selected such that said main lobes have nulls corresponding to power line harmonic frequencies.

14. The method of claim 13 wherein the pulse duration interval of said data is selected such that each main lobe has a bandwidth of 30 Hz.

15. The method of claim 13 wherein each of said tone frequencies lying within a harmonic interval corresponds to a main lobe lying within said harmonic interval and at least one of said main lobes has at least one null coinciding with the tone frequency of another main lobe within said harmonic interval.

* * * * *